(12) United States Patent
Cai et al.

(10) Patent No.: US 11,438,305 B2
(45) Date of Patent: Sep. 6, 2022

(54) METHODS, ROUTERS, MEDIA AND APPARATUS FOR IMPLEMENTING ENHANCED UPNP SUBSCRIPTIONS

(71) Applicant: ARRIS Enterprises LLC, Suwanee, GA (US)

(72) Inventors: Linzhou Cai, Guangdong (CN); Yongqiang Ye, Guangdong (CN)

(73) Assignee: ARRIS Enterprises LLC, Suwanee, GA (US)

( * ) Notice: Subject to any disclaimer, the term of this patent is extended or adjusted under 35 U.S.C. 154(b) by 5 days.

(21) Appl. No.: 17/234,195

(22) Filed: Apr. 19, 2021

(65) Prior Publication Data
US 2022/0021647 A1 Jan. 20, 2022

(30) Foreign Application Priority Data
Jul. 16, 2020 (CN) .......................... 202010688094.1

(51) Int. Cl.
*G06F 15/173* (2006.01)
*H04L 61/2582* (2022.01)
(Continued)

(52) U.S. Cl.
CPC ........ *H04L 61/2582* (2013.01); *G06F 16/955* (2019.01); *H04L 63/0236* (2013.01); *H04L 67/16* (2013.01); *H04L 67/26* (2013.01)

(58) Field of Classification Search
CPC . H04L 61/2582; H04L 67/26; H04L 63/0236; H04L 67/16; G06F 16/955
(Continued)

(56) References Cited

U.S. PATENT DOCUMENTS

| 11,019,076 B1* | 5/2021 | Jakobsson | ........... H04L 63/0236 |
| 2009/0116479 A1* | 5/2009 | Choi | .................. G06Q 30/0225 370/389 |

(Continued)

FOREIGN PATENT DOCUMENTS

EP 2533464 A1 * 12/2012 ......... H04L 12/2809

OTHER PUBLICATIONS

UPnP Device Architecture 2.0 Document Revision Date: Apr. 17, 2020 (Year: 2020).*
(Continued)

*Primary Examiner* — Anthony Mejia
(74) *Attorney, Agent, or Firm* — Panitch Schwarze Belisario & Nadel

(57) ABSTRACT

The disclosure relates to methods, routers, media and apparatus for implementing enhanced UPnP subscriptions. According to an embodiment of the disclosure, there is provided a method for implementing an enhanced UPnP subscription, comprising, by a UPnP-enabled router: receiving a subscription message for a subscription, wherein the subscription message specifies a delivery uniform resource locator (URL), the delivery URL is a location where an event message targeted by the subscription is to be sent; checking, based on a whitelist, whether an IP address or a domain name in the delivery URL is contained in the whitelist; and determining whether to reject the subscription message based on the checking result. Through embodiments of the disclosure, both flexible subscription and high security can be achieved.

17 Claims, 5 Drawing Sheets

(51) Int. Cl.
    *H04L 9/40*         (2022.01)
    *G06F 16/955*    (2019.01)
    *H04L 67/51*     (2022.01)
    *H04L 67/55*     (2022.01)

(58) Field of Classification Search
    USPC .......................................................... 709/223
    See application file for complete search history.

(56) References Cited

U.S. PATENT DOCUMENTS

| | | | |
|---|---|---|---|
| 2010/0049965 A1* | 2/2010 | Han | G06F 21/6263 |
| | | | 713/151 |
| 2010/0064351 A1* | 3/2010 | Johansson | H04L 63/029 |
| | | | 726/4 |
| 2011/0320550 A1* | 12/2011 | Lawson | H04L 51/32 |
| | | | 709/206 |
| 2018/0146001 A1* | 5/2018 | Chien | H04L 63/0236 |
| 2019/0230126 A1* | 7/2019 | Kumar | H04L 45/74 |
| 2020/0320149 A1* | 10/2020 | Kline | G06F 16/958 |
| 2021/0006591 A1* | 1/2021 | Akuka | H04L 63/1483 |
| 2021/0185018 A1* | 6/2021 | Soman | H04L 63/0407 |

OTHER PUBLICATIONS

Victory, Detecting the New CallStranger UPnP Vulnerability With Zeek, Jun. 10, 2020 (Year: 2020).*

Presser et al., "UPnP™ Device Architecture 1.1," UPnP™ Forum, (Oct. 15, 2008), pp. 1-129, (136 pages total).

* cited by examiner

100

101: Receiving a subscription message for a subscription, wherein the subscription message specifies a delivery URL, the delivery URL is a location where an event message targeted by the subscription is to be sent

103: Checking, based on a whitelist, whether an IP address or a domain name in the delivery URL is contained in the whitelist

105: Determining whether to reject the subscription message based on the checking result

FIG. 1

METHODS, ROUTERS, MEDIA AND APPARATUS FOR IMPLEMENTING ENHANCED UPNP SUBSCRIPTIONS

TECHNICAL FIELD

The present disclosure relates to network communication, particularly to methods, routers, media and apparatus for implementing enhanced UPnP subscriptions.

BACKGROUND

Universal Plug and Play (UPnP) technology defines an architecture for pervasive peer-to-peer network connectivity of intelligent appliances, wireless devices, and PCs of all form factors.

The UPnP Device Architecture (UDA) is designed to support zero-configuration, "invisible" networking, and automatic discovery for a breadth of device categories from a wide range of vendors. Under UDA, a device can dynamically join a network, obtain an IP address, convey its capabilities, and learn about the presence and capabilities of other devices. Finally, a device can leave a network smoothly and automatically without leaving any unwanted state behind.

UPnP devices can be implemented using any programming language, and on any operating system. A UPnP device can be seen as a container containing services and nested in conventional devices. That is, a device under UPnP cannot be understood only as a device in the sense of hardware but should include service functions.

Two classifications of devices are defined by the UPnP architecture: controlled devices, and control points. A controlled device functions in the role of a server, responding to requests from control points. Both control points and controlled devices can be implemented on a variety of platforms including personal computers and embedded systems.

After a control point has discovered a controlled device and retrieved a description of the controlled device and its services, the control point has the essentials for eventing. Eventing is related with the control point sending actions to the controlled device to make the controlled device provide a service. A UPnP service description includes a list of commands, or actions, to which the service responds, and parameters, or arguments for each action. A service description also includes a list of variables. These variables model the state of the service at run time, and are described in terms of their data type, range, and event characteristics. The service publishes updates when these variables change, and a control point may subscribe to receive this information.

To subscribe to eventing for a service, a subscriber sends a subscription message containing a Uniform Resource Locator (URL) for a publisher, a service identifier for the publisher, and a delivery URL for event messages. The URL and service identifier for the publisher come from e.g., a UPnP service description previously received. If the subscription is accepted by the publisher, the publisher responds with a unique identifier for this subscription and a duration for this subscription. An even message will be notified to the delivery URL. UPnP protocol (e.g., UPnP Device Architecture 1.1, Section 4.1.2) provides with SUBSCRIBE method to provide the notification function.

Wherein, a subscription message (i.e., a subscription request) is sent with the following format by utilizing the SUBSCRIBE method and NT and CALLBACK header fields.

SUBSCRIBE publisher path HTTP/1.1
HOST: publisher host:publisher port
USER-AGENT: OS/version UPnP/1.1 product/version
CALLBACK: <delivery URL>
NT: upnp:event
TIMEOUT: Second-requested subscription duration Related information of the publisher is specified with the "publisher path" in SUBSCRIBE as well as the "publisher host" and the "publisher port" in HOST. The "delivery URL" in CALLBACK is where the event message is to be sent.

However, there are no restrictions on the "delivery URL" in CALLBACK. That is, the "delivery URL" can be any web address (i.e., link). When the publisher accepts the subscription, it does not perform any verification or checking on the URL in CALLBACK.

This brings at least two kinds of security problems, including Data Exfiltration and reflection amplification TCP DDos (Distributed Denial-of service) attacks. Data exfiltration is more covert than data leakage. For example, when a hacker penetrates a device in a local area network, he can use the SUBSCRIBE method to forge a subscription message and direct the event message from the publisher to the delivery URL where the hacker intends the event message to go. Since the publisher does not perform any verification on the URL in the "delivery URL", the event message will be sent to the "delivery URL" contained in CALLBACK, which may cause data exfiltration. In addition, the UPnP device is easily used by the hacker as a source of reflection amplification TCP DDos attacks, thereby involving the network where the UPnP device is located in the DDos attacks.

SUMMARY

According to a first aspect of the disclosure, there is provided a method for implementing an enhanced UPnP subscription, comprising, by a UPnP-enabled router: receiving a subscription message for a subscription, wherein the subscription message specifies a delivery URL, the delivery URL is a location where an event message targeted by the subscription is to be sent; checking, based on a whitelist, whether an IP address or a domain name in the delivery URL is contained in the whitelist; and determining whether to reject the subscription message based on the checking result.

In some embodiments, the whitelist contains at least one of the following: IP addresses allowed to use a UPnP subscription function; or domain names allowed to use the UPnP subscription function.

In some embodiments, an IP address included in the whitelist is a public IP or a private IP, a domain name included in the whitelist is a public domain name or a private domain name.

In some embodiments, a publisher indicated by the subscription message is the router. The method may further comprise: in response to determining not to reject the subscription message based on the checking result, determining the subscription is accepted.

In some embodiments, the method may further comprise: in response to the subscription is accepted, sending an initial event message to the delivery URL In some embodiments, the method may further comprise: in response to eventing at the router during a duration of the subscription, sending a subsequent event message to the delivery URL.

In some embodiments, the initial event message contains a name and an initial value of an evented variable that models a state of the router. The subsequent event message contains an updated value of the evented variable at the time of the eventing at the router.

In some embodiments, the state of the router includes at least one of: joining-in/leaving of a UPnP device under the router; or an operation mode of a UPnP device under the router.

In some embodiments, a publisher indicated by the subscription message is a UPnP device under the router. The method further comprise: in response to determining not to reject the subscription message based on the checking result, sending the subscription message passing the checking to the UPnP device, wherein the UPnP device is to send an event message to the delivery URL during a duration of the subscription.

In some embodiments, the method may further comprise: receiving a user configuration for the whitelist, and storing the whitelist configured based on the user configuration.

In some embodiments, the method may further comprise: determining whether there is a whitelist or whether the whitelist is empty; in response to determining that there is a whitelist and the whitelist is empty, or determining that there is no whitelist, checking whether the delivery URL is on a originating IP; otherwise, checking based on the whitelist whether the IP address or domain name of the delivery URL is contained in the whitelist.

According to a second aspect of the disclosure, there is provided a UPnP-enabled router comprising one or more processors and a memory coupled to the one or more processors. The memory stores computer-readable program instructions that, when executed by the one or more processors, cause the one or more processors to perform any method as mentioned above.

According to a third aspect of the disclosure, there is provided a modem comprising any UPnP-enabled router as mentioned above.

According to a fourth aspect of the disclosure, there is provided a non-transitory computer-readable storage medium having stored thereon computer-readable program instructions that, when executed by a processor, cause the processor to perform any method as mentioned above.

According to a fifth aspect of the disclosure, there is provided an apparatus for implementing an enhanced UPnP subscription, comprising means for implementing operations of any method as mentioned above.

BRIEF DESCRIPTION OF THE DRAWINGS

FIG. 1 is a flow diagram illustrating an example method for implementing an enhanced UPnP subscription function according to an embodiment of the present disclosure.

DETAILED DESCRIPTION

Figure 2:
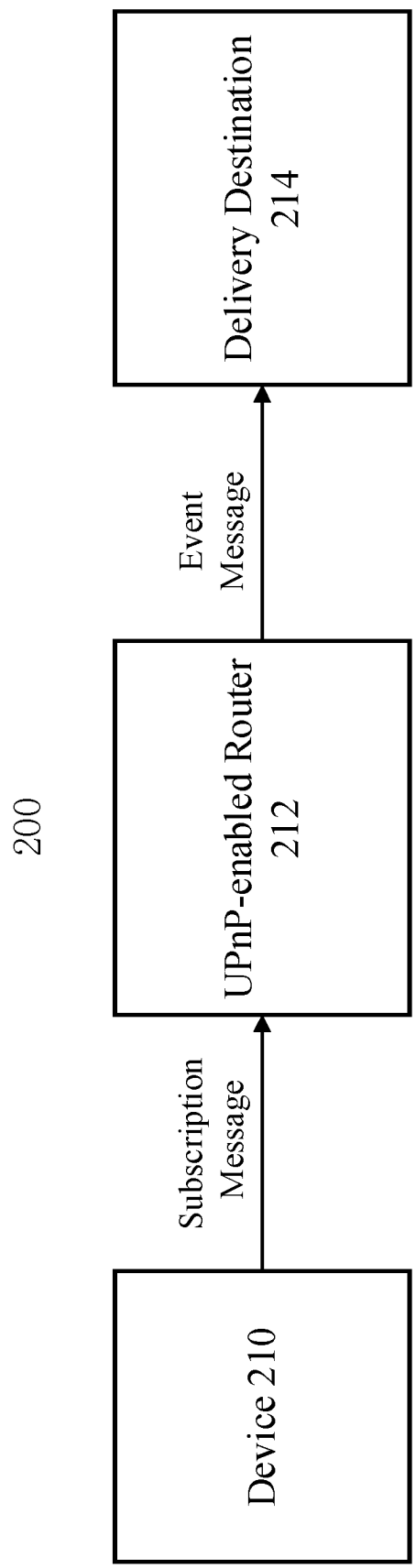
FIG. 2 is a diagram illustrating an example system for implementing an enhanced UPnP subscription function according to an embodiment of the present disclosure.

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

In order to fix the above two security issues, the latest UPnP offers an official solution that only allows the originating IP to receive notifications. (See, e.g., https://github.com/miniupnp/miniupnp/blob/master/miniupnpd/ upnphttp.c#L671.) Specifically, when a subscription message is received, it is first checked whether the "delivery URL" in CALLBACK is on the originating IP from which the subscription message was originated, and a correct URL is extracted only after verifying that the "delivery URL" is on the originating IP.

The solution has at least the following problems: a UPnP device is generally restricted to be within a local area network and therefore its IP is also restricted to be within the local area network. Since the "delivery URL" is restricted to the originating IP, URLs on any other IP than the originating IP cannot be used. This makes the subscription/notification function of UPnP very limited. For example, a system deployed on the internet would not be able to use the subscription function, i.e., it cannot receive event messages directly. For example, it is also difficult to extend the subscription function to mobile users because a mobility agent generally uses a gateway address, e.g., 192.168.0.1, which cannot generally be used as the originating IP. A mobile device (such as Customer Premises Equipment (CPE)) that establishes a communication channel with the mobility agent, cannot use the subscription function, so that related mobile users cannot receive event messages from the publisher.

The inventors of the present application have conceived that setting a whitelist at a router and checking a subscription message with the whitelist can achieve both flexible subscription and high security.

FIG. 1 is a flow diagram illustrating an example method 100 for implementing an enhanced UPnP subscription function according to an embodiment of the present disclosure.

The method 100 is performed, for example, by a UPnP-enabled router. As shown, the method 100 includes a step 101 where the router receives a subscription message for a subscription, i.e. a subscription request. The subscription message specifies a delivery URL, which is the location where an event message targeted by the subscription is to be sent.

The subscription message is constructed using the SUBSCRIBE method and the NT and CALLBACK header fields according to the UPnP protocol as described above, for example. The delivery URL is defined in the CALLBACK header field. The delivery URL is the location where the event message targeted by the subscription is to be sent.

In some embodiments, the subscription message may be sent by any UPnP device under the router.

In other embodiments, the subscription message may also be sent by a non-UPnP device (for example, a device that does not support or does not enable UPnP) within the local area network.

In other words, the subscription message may come from any device within the local area network (or the IP corresponding to the device). However, the gateway IP, i.e. the router IP, such as 192.168.0.1, 192.168.1.1, 192.168.3.1, etc., does not generally serve as an IP address from which the subscribe message originates.

The delivery URL may be an HTTP URL over TCP (prefixed by "HTTP:/"). And the URL may be a complete URL and cannot be truncated.

As shown, the method 100 further includes step 103 where the router checks, based on a whitelist, whether an IP address or a domain name in the delivery URL is contained in the whitelist. The method 100 further comprises step 105 where the router determines whether to reject the subscription message based on the checking result.

In the embodiments of the present disclosure, when the router receives the subscription message, the router may extract the IP or domain name in the delivery URL, and compare the extracted IP or domain name with the IP or domain name in the whitelist.

If the extracted IP or domain name exists in the whitelist, which means the checking based on the whitelist is successful, the router will determine not to reject the subscription message and continues to perform subsequent operations. For example, in the case where the publisher targeted by the subscription is the router itself, the method may include determining that the subscription is accepted, in response to determining not to reject the subscription message based on the checking result. After the subscription is received, the method may further include sending an initial event message to the delivery URL. Thereafter, when it is eventing at the router during the duration of the subscription, the router may send a subsequent event message to the delivery URL. In the case where the publisher targeted by the subscription is a UPnP device under the router, the router may send the subscription message passing the checking to the UPnP device. After the subscription is successful, the UPnP device will send event messages, including initial event messages and subsequent event messages, to the delivery URL during the duration of the subscription. This will be described in more detail with reference to FIGS. 2 and 3 below.

If the extracted IP or domain name does not exist in the whitelist, which means the checking based on the whitelist is failed, the router will reject the subscription message, and the subscription fails.

The whitelist is a list of IP addresses and/or domain names allowed to use a UPnP subscription function. The whitelist may contain at least one of the following: IP addresses allowed to use a UPnP subscription function; or domain names allowed to use the UPnP subscription function. The IP addresses or domain names contained in the whitelist may be public IPs or domain names, or private IPs (i.e., local area network IPs) or domain names. In some embodiments the whitelist contains at least two columns, i.e. IP addresses and corresponding domain names, for example. That is, the whitelist may contain a mapping of the two. In some embodiments, the whitelist may contain either IP addresses or domain names. Those skilled in the art can make settings as needed.

In other words, the IP addresses and the domain names included in the whitelist can be freely set by the user without being limited to the local area network.

The user may set/configure the whitelist, for example, via various router settings interfaces, such as an App or a setting web page on a cell phone, a setting web page on a computer, a cloud-based webpage, and so on. The router may receive the user configuration for the whitelist and store the whitelist configured based on the user configuration.

Compared with the method of checking the delivery URL based on the originating IP, the method provided by the embodiments of the present disclosure improves security by setting a whitelist and performing checking on the subscription message based on the whitelist at the router. For example, it is difficult for a hacker to obtain a whitelist in a router. Even if the hacker penetrates a device in the local area network where the router is at and forges a subscription message, if the forged subscription message cannot pass the checking based on the whitelist at the router, the forged subscription message will be rejected, making it difficult to cause data exfiltration. In addition, due to the checking based on the whitelist, a UPnP device is not readily available to the hacker as a source of reflection-amplified TCP DDos attacks, thereby avoiding the network in which the UPnP device is located being involved in the DDos attacks.

Furthermore, the method provided by the embodiments of the present disclosure provides greater subscription flexibility, as compared with the method that restricts the delivery URL on the originating IP of the subscription message. As long as the delivery URL is on any IP or domain name in the whitelist, the subscription function can be accessed to receive the subscribed event messages. This means that any URL that passes the checking based on the whitelist, no matter it is on the internet or within the local area network, can use the subscription function.

Further, the whitelist may contain a gateway IP. This means that a subscription for the gateway IP can also pass the checking, so that an event message of the publisher can be sent to the gateway IP. Then the event message is sent to the mobile user via the communication channel established by the mobile agent and the CPE, so that the mobile user can learn the relevant information and/or perform relevant configuration.

In some embodiments, before step 103, the method may also include determining by the router whether there is a whitelist or whether the whitelist is empty. In response to it is determined that there is a whitelist and the whitelist is empty, or there is no whitelist, the router checks whether the delivery URL is on an originating IP to determine whether to reject the subscription message. If it is determined that a whitelist exists and the whitelist is not empty, the method proceeds to step 103.

FIG. 2 is a diagram illustrating an example system 200 for implementing an enhanced UPnP subscription function according to an embodiment of the present disclosure.

As shown, the system 200 includes a device 210, a UPnP-enabled router 212, and a delivery destination 214.

Device 210 may be any device under the local area network to which the router corresponds. The UPnP-enabled router 212 connects, for example, a plurality of UPnP devices (not shown) and there will continue to be UPnP devices connected to or disconnected from the router in the future. A router may be considered as being eventing when a UPnP device is connected to or is disconnected from the router (e.g., a printer is connected to or disconnected from the router). A router may also be considered as being eventing when the state of the UPnP device itself connected to the router changes (e.g., the printer goes from being performing a print service to having completed the print service), which may cause some information in the router to be updated.

The UPnP subscription function may be used if there is a system of interest that wants to know the presence of the UPnP devices under the router, and/or change of the state of the UPnP devices. For example, as shown, a subscription message may be sent by any device 210 within the local area network to the router 212. The subscription message may specify the router 212 as the publisher, for example, by specifying the path, host number and port number of the router with the "publisher path" in SUBSCRIBE, "publisher host" and "publisher port" in the HOST field. The subscription message may specify the URL of the system of interest as the delivery URL, e.g., in the CALLBACK header.

The router 212 receives the subscribe message and compares the IP or domain name in the delivery URL in the subscribe message to the whitelist. If the IP or domain name in the delivery URL is included in the whitelist, the router may accept the subscription, i.e., the subscription is successful.

The router may then send an event message to the delivery destination 214 indicated by the delivery URL. The router 212 may first send an initial event message upon accepting the subscription, after which the router 212 may send a subsequent event message in response to eventing at the router 212.

The initial event message may contain a name and an initial value of an evented variable that models the state of the router. The subsequent event message may contain an updated value of the evented variable at the time of the eventing at the router. For example, the state of the router may include at least one of: joining-in/leaving of a UPnP device under the router; or an operation mode of a UPnP device under the router. For example, the joining-in/leaving of a UPnP device may cause a change in the state of the router, which may be regarded as the eventing at the router 212, thereby triggering the transmission of an event message to let the system at the delivery destination know the change. Similarly, when an operation mode of an UPnP device changes, for example, the printer changes from being printing to standby or to a failure mode, which may also cause the state of the router to change, thereby triggering the transmission of a corresponding event message, so that the system at the delivery destination is made aware of the change caused by the change of the operation mode of the printer under the router.

Figure 3:
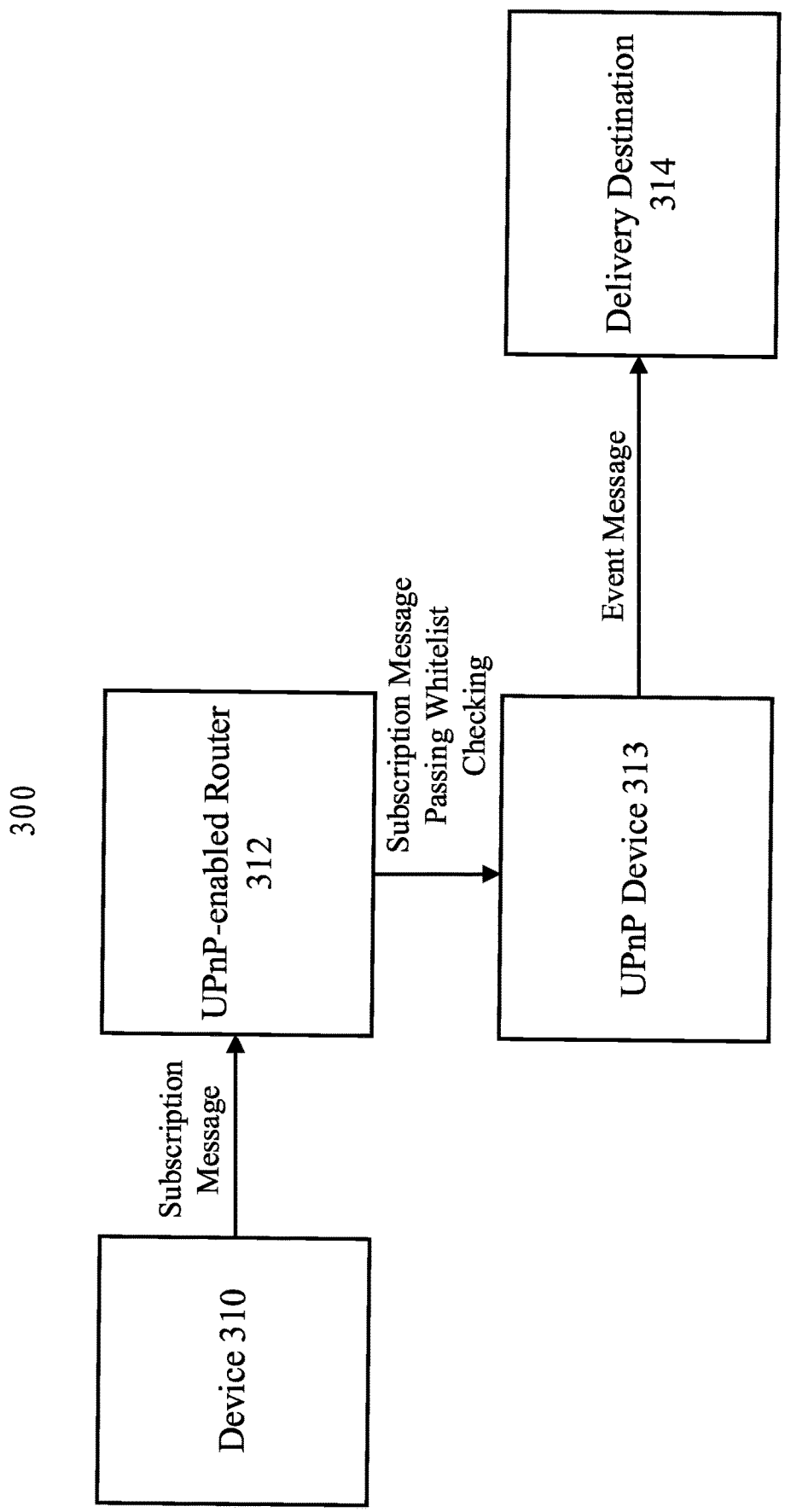
FIG. 3 is a diagram illustrating an example system for implementing an enhanced UPnP subscription function according to an embodiment of the present disclosure.

FIG. 3 is a diagram illustrating an example system 300 for implementing an enhanced UPnP subscription function according to an embodiment of the present disclosure.

As shown, the system 300 includes a device 310, a UPnP-enabled router 312, a UPnP device 313, and a delivery destination 314. Among them, the UPnP device 313 is a UPnP device connected to the router 312.

In some cases, a subscription message may be sent by the device 310 when a subscription to eventing of the UPnP device 313 under the router 312 is desired. The subscription message may specify the UPnP device 313 as the publisher by specifying the path, host number and port of the UPnP device 313 with the "publisher path" in SUBSCRIBE, and the "publisher host" and the "publisher port" in the HOST field. Likewise, the subscription message may specify the URL of the system of interest as the delivery URL, e.g., in the CALLBACK header.

The UPnP-enabled router 312 receives the subscription message and performs checking on the subscription message based on the whitelist it stores, i.e., comparing the IP or domain name in the delivery URL with the IPs or domain names in the whitelist. The checking method is similar to the method described with respect to FIG. 2 and will not be described in detail again.

If the checking based on the whitelist is successful, the router 312 does not reject the subscription message and performs subsequent operations, for example, transmitting the subscription message passing the checking to the UPnP device 313. The UPnP device 313 receives the subscription message. Upon the subscription is accepted, the UPnP device 313 transmits an event message to the delivery destination 314. In this case, the event message, no matter it is an initial event message or a subsequent event message, contains the name and variable value of the evented variable that models the state of the UPnP device 313.

If the checking based on the whitelist is not successful, the router 312 directly rejects the subscribe message. The subscription message will not be forwarded to the UPnP device 313 nor will there be any subsequent transmission of the event message.

Figure 4:
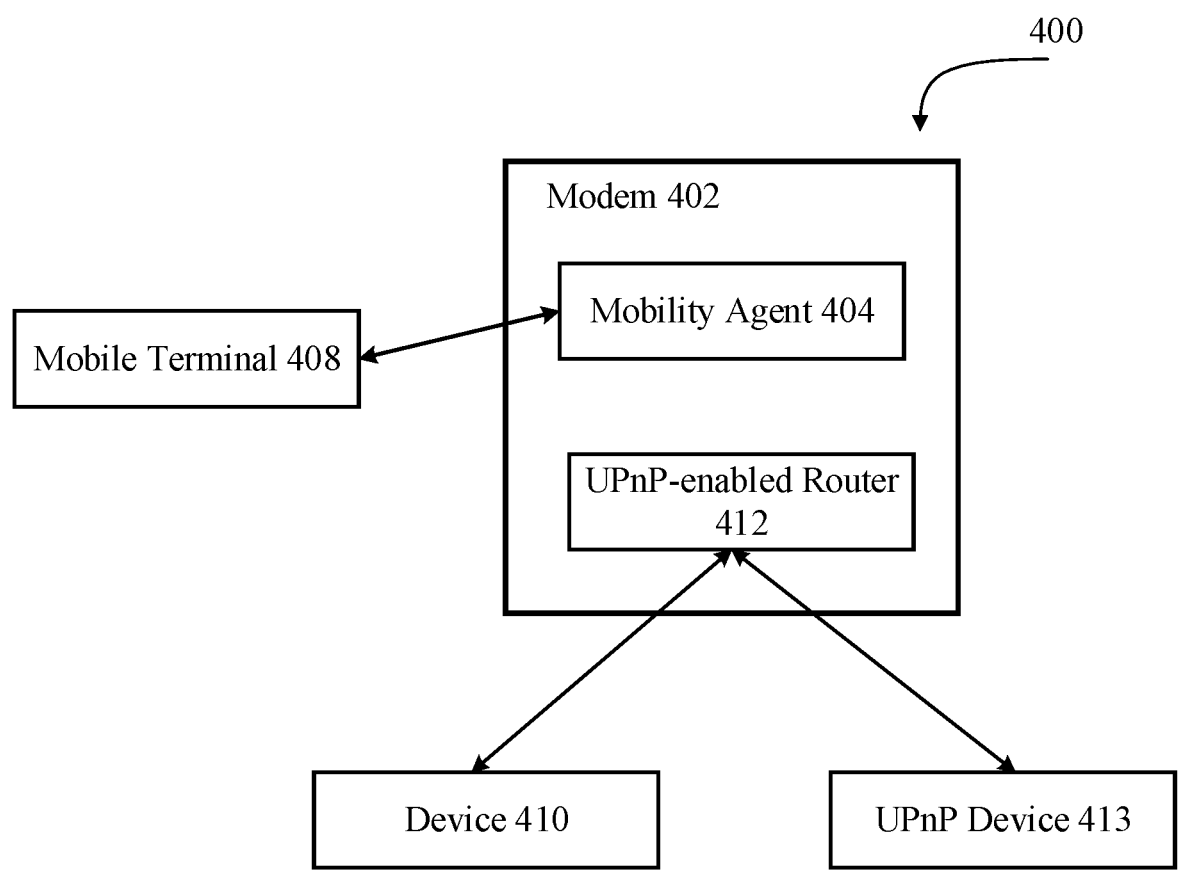
FIG. 4 is a diagram illustrating an example system for implementing an enhanced UPnP subscription function according to an embodiment of the present disclosure.

FIG. 4 is a diagram illustrating an example system 400 for implementing an enhanced UPnP subscription function according to an embodiment of the present disclosure.

As shown, system 400 includes a modem 402, which incorporates a UPnP-enabled router 412. The router 412 is similar to the router described above with reference to FIGS. 1-3. The UPnP-enabled router 412 may be implemented as a module or component integrated into the modem 402.

Optionally, modem 402 may also incorporate a mobility agent 404. The mobility agent 404 establishes a communication channel with the mobile terminal 408, for example, through a mobile device such as a CPE (not shown). The mobility agent 404 typically uses a gateway IP (i.e., a router IP), such as 192.168.0.1.

The device 410 and the UPnP device 412 are connected to the modem 402, particularly to the router 412. The device 410 may be a non-UPnP device. Only one device 410 and one UPnP device 412 are shown in the figure, and those skilled in the art will appreciate that there may be multiple devices 410 and multiple UPnP devices 412.

Any of the device 410 and the UPnP device 412 may send a subscription message to the router 412, and any of the router 412 and the UPnP device 412 may act as the publisher of a subscription.

In some embodiments, the delivery URL in the subscribe message may contain the gateway IP, while the whitelist used by the router 412 also contains the gateway IP. Thus, the subscribe message will pass the checking based on the whitelist at the router 412. In the event that the subscription is accepted, the publisher (e.g., the router 412 or the UPnP device 412) may send an event message to the mobility agent, which sends it to the mobile user via an established communication channel. This may extend the subscription function to the mobile users.

Figure 5:
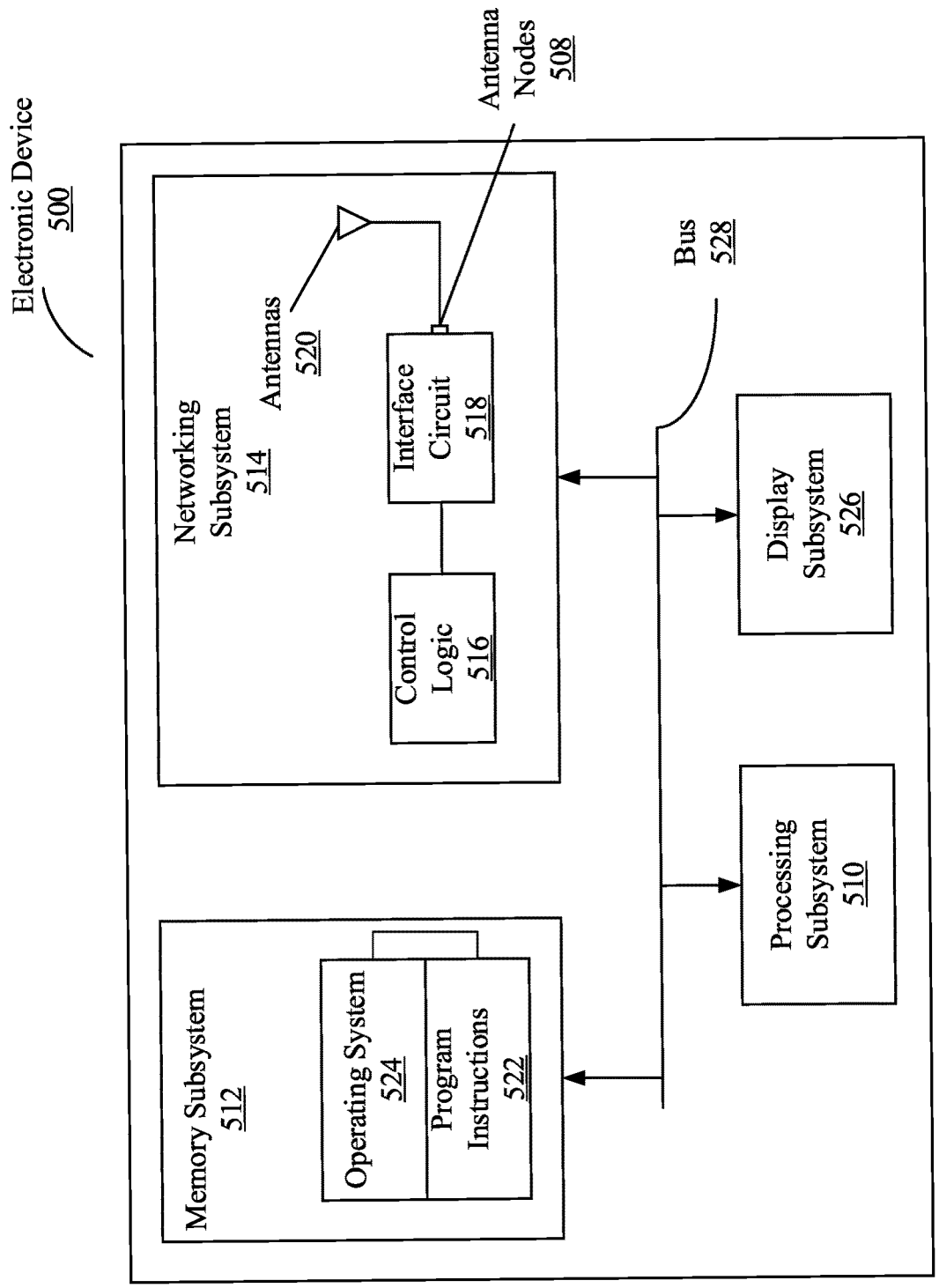
FIG. 5 is an example block diagram of an example electronic device according to an embodiment of the present disclosure.

FIG. 5 is an example block diagram of an example electronic device 500 according to an embodiment of the present disclosure.

The electronic device 500 may be used to implement various devices or components in various systems (e.g., the systems 200, 300, 400) according to the embodiments of the present disclosure, such as one of the following: the devices 210, 310, 410; the UPnP devices 313, 413; or the routers 212, 312 that support UPnP; and modem 402.

As shown in FIG. 5, the electronic device 500 includes a processing subsystem 510, a memory subsystem 512, and a networking subsystem 514. The processing subsystem 510 includes one or more devices configured to perform computational operations. For example, the processing subsystem 510 can include one or more microprocessors, ASICs, microcontrollers, programmable-logic devices, graphical processor units (GPUs) and/or one or more digital signal processors (DSPs).

The memory subsystem 512 includes one or more devices for storing data and/or instructions for the processing subsystem 510 and the networking subsystem 514. For example, the memory subsystem 512 can include dynamic random access memory (DRAM), static random access memory (SRAM), and/or other types of memory (which collectively or individually are sometimes referred to as a 'computer-readable storage medium'). In some embodiments, instructions for the processing subsystem 510 in the memory subsystem 512 include: one or more program modules or sets of instructions (such as program instructions 522 or an operating system 524), which may be executed by the processing subsystem 510. Note that the one or more computer programs may constitute a computer-program mechanism. Moreover, instructions in the various modules in the memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by the processing subsystem 510.

In addition, the memory subsystem 512 can include mechanisms for controlling access to the memory. In some embodiments, the memory subsystem 512 includes a memory hierarchy that comprises one or more caches coupled to a memory in the electronic device 500. In some of these embodiments, one or more of the caches is located in the processing subsystem 510.

In some embodiments, the memory subsystem 512 is coupled to one or more high-capacity mass-storage devices (not shown). For example, the memory subsystem 512 can be coupled to a magnetic or optical drive, a solid-state drive, or another type of mass-storage device. In these embodiments, the memory subsystem 512 can be used by the electronic device 500 as fast-access storage for often-used data, while the mass-storage device is used to store less frequently used data.

The networking subsystem 514 includes one or more devices configured to couple to and communicate on a wired and/or wireless network (i.e., to perform network operations), including: a control logic 516, an interface circuit 518 and one or more antennas 520 (or antenna elements). (While FIG. 5 includes one or more antennas 520, in some embodiments electronic device 500 includes one or more nodes, such as nodes 508, e.g., a pad, which can be coupled to the one or more antennas 520. Thus, electronic device 500 may or may not include the one or more antennas 520.) For example, the networking subsystem 514 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of the electronic device 500 may be adapted or changed using pattern shapers (such as reflectors) in one or more antennas 520 (or antenna elements), which can be independently and selectively electrically coupled to ground to steer the transmit antenna radiation pattern in different directions. Thus, if the one or more antennas 520 includes N antenna-radiation-pattern shapers, the one or more antennas 520 may have 2N different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 4 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

The networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, the electronic device 500 may use the mechanisms in networking subsystem 514 for performing simple wireless communication between the electronic devices, e.g., transmitting frames and/or scanning for frames transmitted by other electronic devices.

Within the electronic device 500, the processing subsystem 510, the memory subsystem 512, and the networking subsystem 514 are coupled together using a bus 528. The bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, the electronic device 500 includes a display subsystem 526 for displaying information on a display, which may include a display driver and the display, such as a liquid-crystal display, a multi-touch touchscreen, etc.

The electronic device 500 can be (or can be included in) any electronic device with at least one network interface. For example, the electronic device 500 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, an access point, test equipment, and/or another electronic device.

Although specific components are used to describe the electronic device 500, in alternative embodiments, different components and/or subsystems may be present in the electronic device 500. For example, the electronic device 500 may include one or more additional processing subsystems, memory subsystems, networking subsystems, and/or display subsystems. Additionally, one or more of the subsystems may not be present in the electronic device 500. Moreover, in some embodiments, the electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in the electronic device 500. For example, in some embodiments, the program instructions 522 are included in the operating system 524 and/or the control logic 516 is included in the interface circuit 518.

Moreover, the circuits and components in the electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of the networking subsystem 514. The integrated circuit may include hardware and/or software mechanisms that are used for transmitting wireless signals from the electronic device 500 and receiving signals at the electronic device 500 from other electronic devices. Aside from the mechanisms herein described, radios are generally known in the art and hence are not described in detail. In general, the networking subsystem 514 and/or the integrated circuit can include any number of radios. Note that the radios in multiple-radio embodiments function in a similar way to the described single-radio embodiments.

In some embodiments, the networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using the program instructions 522, the operating system 524 (such as a driver for the interface circuit 518) or in firmware in the interface circuit 518. Alternatively or additionally, at least some of the operations in the communication techniques may be implemented in a physical layer, such as hardware in the interface circuit 518.

The present disclosure may be implemented as any combination of an apparatus, a system, an integrated circuit, and a computer program on a non-transitory computer readable recording medium. The one or more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable storage medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable storage medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

What we claim is:

1. A method for implementing an enhanced UPnP subscription, comprising, by a UPnP-enabled router:
   receiving a subscription message for a subscription, wherein the subscription message specifies a delivery uniform resource locator (URL), the delivery URL is a location where an event message targeted by the subscription is to be sent;
   checking, based on a whitelist, whether an IP address or a domain name in the delivery URL is contained in the whitelist; wherein checking the whitelist includes:
   determining whether there is a whitelist or whether the whitelist is empty;

in response to determining that there is a whitelist and the whitelist is empty, or determining that there is no whitelist, checking whether the delivery URL is on an originating IP; and determining whether to reject the subscription message based on the checking result.

2. The method of claim 1, wherein the whitelist contains at least one of the following:

IP addresses allowed to use a UPnP subscription function; or domain names allowed to use the UPnP subscription function.

3. The method of claim 2, wherein an IP address included in the whitelist is a public IP or a private IP, or a domain name included in the whitelist is a public domain name or a private domain name.

4. The method of claim 1, wherein a publisher indicated by the subscription message is the router, and the method further comprises:

in response to determining not to reject the subscription message based on the checking result, determining the subscription is accepted.

5. The method of claim 4, further comprising:

in response to the subscription is accepted, sending an initial event message to the delivery URL.

6. The method of claim 5, further comprising:

in response to eventing at the router during a duration of the subscription, sending a subsequent event message to the delivery URL.

7. The method of claim 6, wherein, the initial event message contains a name and an initial value of an evented variable that models a state of the router;

the subsequent event message contains an updated value of the evented variable at a time of the eventing at the router.

8. The method of claim 7, wherein the state of the router includes at least one of:

joining-in/leaving of a UPnP device under the router; or an operation mode of a UPnP device under the router.

9. The method of claim 1, wherein a publisher indicated by the subscription message is a UPnP device under the router, and the method further comprises:

in response to determining not to reject the subscription message based on the checking result, sending the subscription message passing the checking to the UPnP device, wherein the UPnP device is to send an event message to the delivery URL during a duration of the subscription.

10. The method of claim 1, further comprising:

receiving a user configuration for the whitelist; and storing the whitelist configured based on the user configuration.

11. The method of claim 1, wherein checking the whitelist includes:

checking based on the whitelist whether the IP address or the domain name in the delivery URL is contained in the whitelist.

12. The method of claim 1, wherein a publisher indicated by the subscription message is a gateway IP, the whitelist contains the gateway IP, and the method comprises:

establishing a communication channel with a mobile terminal;

in response to determining not to reject the subscription message based on the checking result, determining the subscription is accepted;

transmitting an initial event message to the mobile terminal via the communication channel.

13. A UPnP-enabled router, comprising:

one or more processors, and a memory coupled to the one or more processors, the memory storing computer-readable program instructions that, when executed by the one or more processors, cause the one or more processors to perform the method of claim 1.

14. A modem comprising a UPnP-enabled router of claim 13.

15. The modem of claim 14, wherein a publisher indicated by the subscription message is a gateway IP, the whitelist contains the gateway IP, and the modem comprising:

a mobility agent configured to:

establishing a communication channel with a mobile terminal;

in response to determining not to reject the subscription message based on the checking result, determining the subscription is accepted;

transmitting an initial event message to the mobile terminal.

16. A non-transitory computer-readable storage medium having stored thereon computer-readable program instructions that, when executed by a processor, cause the processor to perform the method of claim 1.

17. An apparatus for implementing an enhanced UPnP subscription, comprising means for implementing operations of the method of claim 1.

* * * * *